United States Patent

Grüning

[11] Patent Number: 6,009,009
[45] Date of Patent: Dec. 28, 1999

[54] LOW-INDUCTANCE CONVERTER

[75] Inventor: Horst Grüning, Wettingen, Switzerland

[73] Assignee: Asea Brown Boveri AG, Baden, Switzerland

[21] Appl. No.: 09/055,714

[22] Filed: Apr. 7, 1998

[30] Foreign Application Priority Data

Apr. 23, 1997 [DE] Germany .............. 197 17 087

[51] Int. Cl.⁶ .............................................. H02M 7/521
[52] U.S. Cl. ............................................................ 363/136
[58] Field of Search ................................... 363/132, 135, 363/136, 141

[56] References Cited

U.S. PATENT DOCUMENTS

| | | | |
|---|---|---|---|
| 4,301,465 | 11/1981 | Masselin | 357/82 |
| 4,578,745 | 3/1986 | Olsson | 363/141 |
| 4,658,344 | 4/1987 | McSparran et al. | 361/145 |
| 5,057,988 | 10/1991 | Theroux et al. | 363/59 |
| 5,544,035 | 8/1996 | Beriger et al. | 363/132 |
| 5,798,916 | 8/1998 | Stacey et al. | 363/135 |
| 5,870,300 | 2/1999 | Blidberg et al. | 363/132 |

FOREIGN PATENT DOCUMENTS

| | | | |
|---|---|---|---|
| 0660496A2 | 6/1995 | European Pat. Off. | H02M 7/00 |
| 4023687A1 | 1/1992 | Germany | H02M 7/48 |
| 9203816 | 6/1992 | Germany | H02M 7/04 |

*Primary Examiner*—Jeffrey Sterrett
*Attorney, Agent, or Firm*—Burns, Doane, Swecker & Mathis, L.L.P.

[57] ABSTRACT

A converter is specified which is distinguished in that a bus system is provided between the paths of a phase module of the converter and allows potential chambers to be formed around the semiconductor switches and/or the circuitry elements. The potential chambers surround the semiconductor switches and the circuitry elements. They comprise two longitudinal metal sheets which are arranged to be insulated from one another, in particular overlapping. In addition, transverse metal sheets may be provided, which are connected to the connections of the semiconductor switches and/or circuitry elements. The potential chambers result in each potential chamber having a potential difference which is only a fraction of the intermediate circuit voltage. The bus system carries out the insulation of the high potential difference corresponding to the intermediate circuit voltage.

12 Claims, 3 Drawing Sheets

LOW-INDUCTANCE CONVERTER

This application claims priority under 35 U.S.C. §§119 and/or 365 to No. 197 17 087.0 filed in Germany on Apr. 23, 1997; the entire content of which is hereby incorporated by reference.

BACKGROUND OF THE INVENTION

1. Field of the Invention

The invention relates to the field of power electronics and is based on a converter as claimed in the preamble of the first claim.

2. Discussion of Background

Such a converter is disclosed, for example, in European Patent Application 0 660 496 A2. The converter disclosed there is essentially composed of two stacks, one stack being fitted with semiconductor switches and the other with circuitry elements, in particular diodes. The two stacks are arranged skillfully in an attempt to design the converter to have as little inductance as possible. To this end, the two stacks are also arranged as close as possible alongside one another. However, this can be done only to a certain extent since, if the intermediate circuit voltage is high, the distance between the stacks must be increased for safety reasons (flashovers). However, this results once again in an undesirable increase in the enclosed circuit area, so that the inductance rises once again.

SUMMARY OF THE INVENTION

Accordingly, one object of the invention is to provide a novel converter which is designed to have low inductance even with high intermediate circuit voltages and which can thus be driven at high clock frequencies. This object is achieved by the features of the independent claim.

The essence of the invention is thus that a bus system is provided between the paths of a phase module of a converter and allows potential chambers to be formed around the semiconductor switches and/or the circuitry elements. The potential chambers surround the semiconductor switches and the circuitry elements. They comprise two longitudinal metal sheets which are arranged to be insulated from one another, in particular overlapping. The longitudinal metal sheets are electrically and/or mechanically connected to the connections of the associated elements. This connection may be made just by connecting the longitudinal metal sheets to the elements via connecting wires or by means of suitable transverse metal sheets. The potential chambers result in each potential chamber having a potential difference which is only a fraction of the intermediate circuit voltage. The bus system carries out the insulation of the high potential difference corresponding to the intermediate circuit voltage. In a preferred exemplary embodiment, this allows the use of an insulating compound which fills the bus system. Since the insulating compound provides better insulation than air, the parts of the converter can be placed even closer together so that the enclosed circuit area, and thus the inductance as well, are minimized. A further improvement is achieved by introducing a mid-potential rail into the bus system. The mid-potential rail is used in particular to provide mechanical robustness for the bus system. Since the potential that acts on this rail corresponds to roughly half the intermediate circuit voltage, the insulation voltage required between the potential chambers is also halved. The arrangement can thus be positioned even closer together.

Further advantageous embodiments result from the appropriate dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
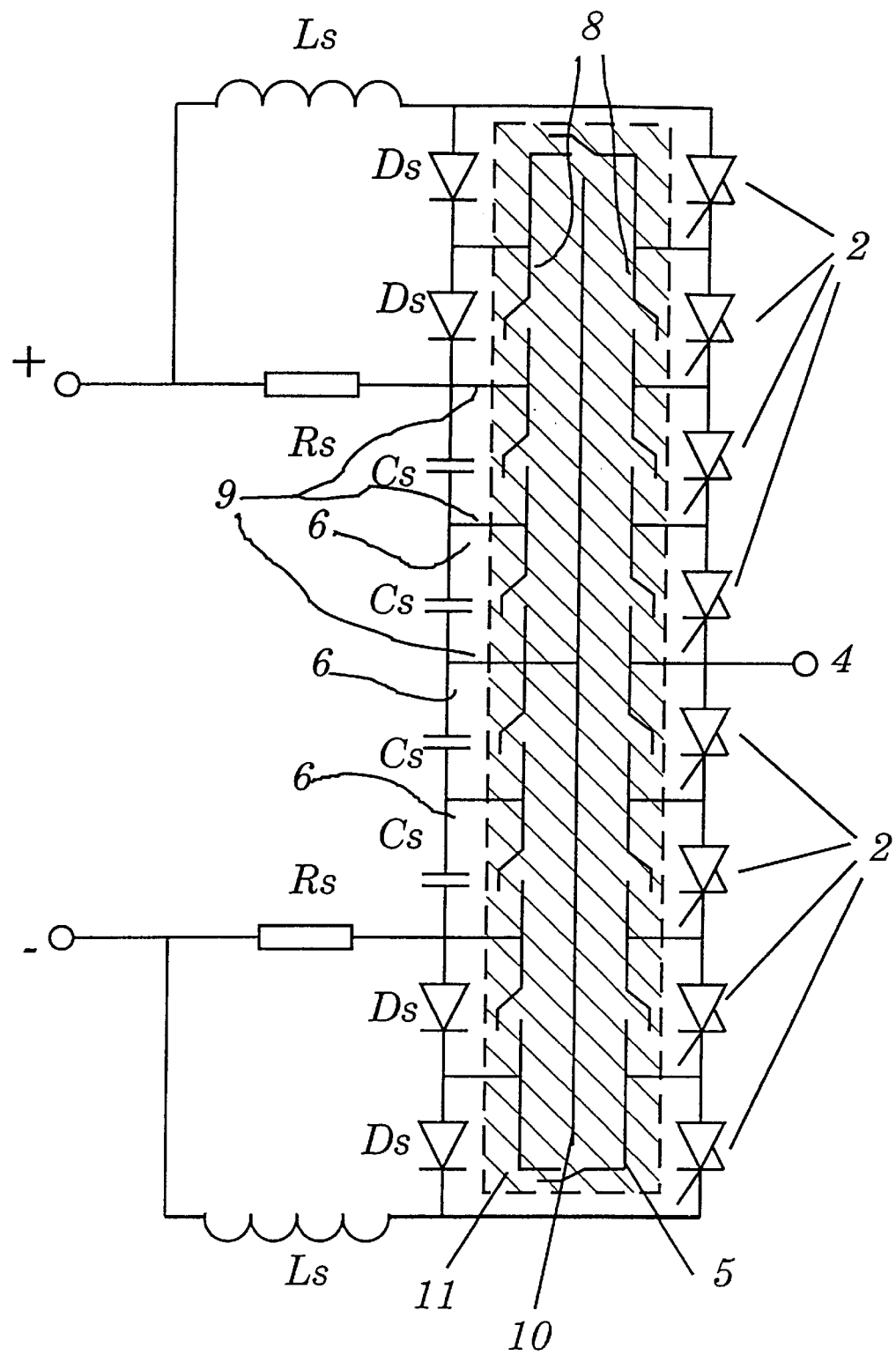
FIG. 1 shows a first exemplary embodiment of the invention.

The designations used in the drawings and their meanings are listed in summarized form in the List of Designations.

DESCRIPTION OF THE PREFERRED EMBODIMENTS

Referring now to the drawings, wherein like reference numerals designate identical or corresponding parts throughout the several views, FIG. 1 shows a phase module 1 of a converter according to the invention. The phase module 1 comprises two branches having series-connected power semiconductor switches 2. A center tap on the two branches forms a phase or load connection 4 to which a load can be connected, so that, for example, a mains coupling or an ASVC apparatus (ASVC=Advanced Static Var Compensation) is formed. Freewheeling and/or circuitry elements Rs, Cs, Ls, Ds are arranged in parallel with the power semiconductor switches 2. These are used in particular to protect the power semiconductor switches 2. Freewheeling or reverse-current diodes may be provided back-to-back with the power semiconductor switches or, as illustrated, may be integrated in the power semiconductor switches. The power semiconductor switches may be GTOs, hard-driven GTOs, IGBTs or other suitable power semiconductor components that can be turned off quickly. Depending on the type of power semiconductor component chosen, different circuitry elements are then also required. Such a phase module 1 may be connected to an intermediate circuit 7 having a positive and a negative connection. The function of the phase module and of the converter formed from at least one phase module is assumed to be known and will not be explained in any more detail at this point.

According to FIG. 1, the power semiconductor switches 2 and the other elements Cs, Rs are now arranged in two paths 3. In order to minimize the inductance of the arrangement it would be desirable to minimize the circuit area enclosed between the paths. This could be achieved by arranging the components as close to one another as possible. However, this is pointless in high-voltage applications, owing to the limits of airgap insulation.

The invention now does this in a different way. As shown in FIG. 1, the components are surrounded by potential chambers 6. The potential chambers 6 are part of a bus system 5 which is arranged between the two paths 3. The potential chambers 6 are essentially formed by two electrically conductive, but non-touching, preferably overlapping longitudinal metal sheets 8. The longitudinal metal sheets may be electrically and/or mechanically connected to the connections of the elements which surround them. This connection may be made, for example, by means of connecting wires, by simple connection or else by two suitably shaped transverse metal sheets 9. If transverse metal sheets are used, only one transverse metal sheet is provided for respectively adjacent components in the series circuit. The transverse metal sheets 9 are also respectively electrically connected to the connections of the elements arranged in the potential chamber formed by longitudinal and transverse metal sheets (for example by soldering or welding, screws, pressure contact or the like). The potential difference within a potential chamber 6, that is to say around a component, is thus only a fraction of the intermediate circuit voltage. The bus system 5 provides the insulation for the high potential differences. In consequence, the paths 3 may be placed close to one another so that the enclosed circuit area, and thus the inductance, are minimized.

In the exemplary embodiment according to FIG. 1, two paths 3 are provided for one phase module 1. The circuitry elements Ds and Cs are allocated to one path and the reverse-conducting power semiconductor switches 2 to a second. The reverse-blocking power semiconductor switches with freewheeling or reverse-current diodes connected back-to-back could also be used instead of the reverse-conducting power semiconductor switches. Four series-connected power semiconductor switches 2 each form one path. A phase or load connection 4, formed by a center tap, is provided in the center of the two branches. Circuitry resistors Rs and current-rise limiting inductors Ls may also be provided to complete the phase module 1. The quantity and nature of the circuitry elements may be selected and defined on the basis of the power semiconductor switch type.

Figure 2:
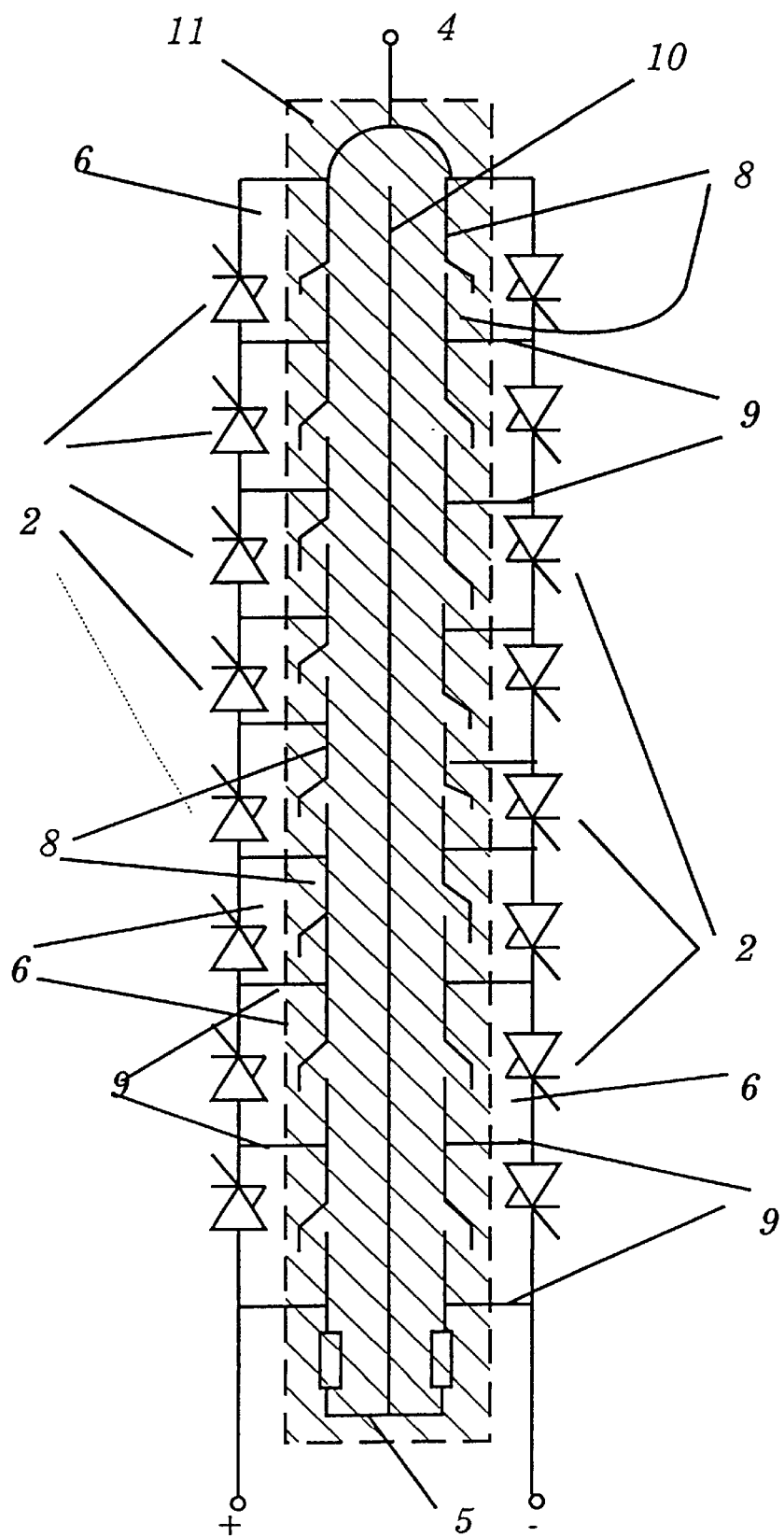
FIG. 2 shows a second exemplary embodiment of the invention.

FIG. 2 shows another embodiment of the invention. In this case, one branch of the phase module 1 in each case forms a path 3. The positive/negative connection and the phase connection 4 are thus arranged at mutually opposite ends of the paths 3. The circuitry elements are not illustrated in the example according to FIG. 2. They may be arranged in a separate path, for example opposite the positive and the negative connection or below or above the switch paths 3 that are illustrated. However, it is essential for the exemplary embodiment according to FIG. 2 that the elements are likewise surrounded by potential chambers 6. The potential chambers 6 are designed identically to those in the example according to FIG. 1.

In both exemplary embodiments, further improved characteristics are achieved if the bus system 5 is potted using an insulating compound 11. Any suitable materials, such as Mikadur or similar materials, may be used as the insulating compound 11. The use of an insulating compound 11 allows the paths 3 and the bus system 5 to be placed even closer to one another, so that the enclosed circuit area becomes even smaller.

The mechanical robustness of the bus system 5 may be improved by introducing a center rail 10. If the center rail 10 is also connected to an intermediate circuit mid-potential, then the insulation voltages required are halved. In FIG. 1, the mid-potential rail 10 is connected to a center connection in the circuitry element path. In the exemplary embodiment according to FIG. 2, the mid-potential is formed by a high-resistance voltage divider (R, R) which is connected to the positive and negative connections. The halving of the insulation voltages allows the bus system 5, and thus the paths 3 as well, to be placed even closer together. Alternatively, the mid-potential rail could be connected to the phase connection.

Figure 3:
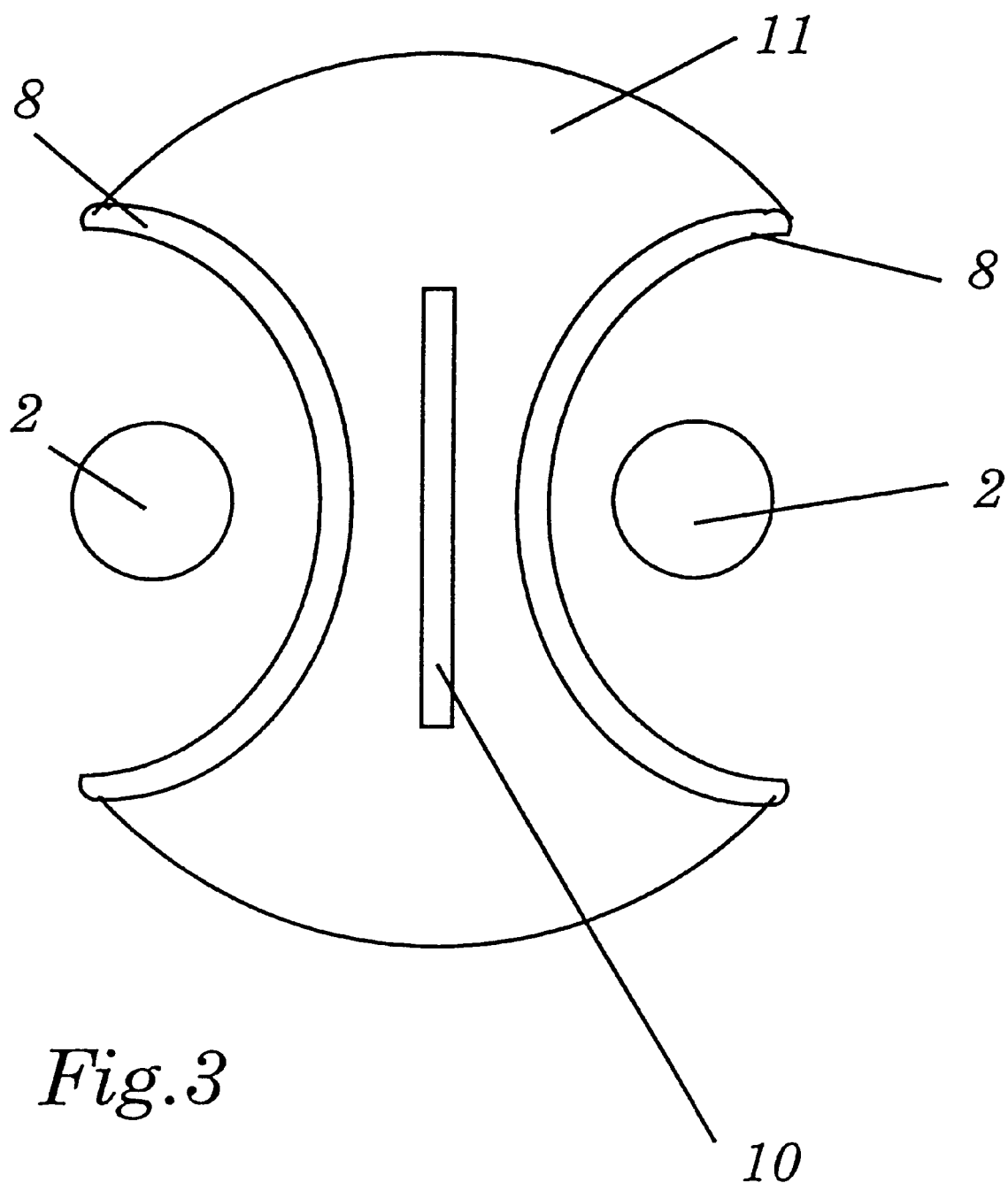
FIG. 3 shows a sectioned detail of the potential chambers.

As illustrated in FIG. 3, the longitudinal metal sheets 8 are advantageously designed in the form of a dome. In consequence, they surround the associated components 2 to a high extent. Instead of the domed longitudinal metal sheets 8, virtually or completely closed potential chambers would also be feasible. The use of domed longitudinal metal sheets 8 is, however, advantageous from the point of view of low assembly cost.

Overall, the invention allows the inductance of a phase module to be minimized further, particularly for high-voltage applications. This provides the capability to use higher drive frequencies.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A converter having at least one phase module which is connected to an intermediate circuit and comprises two branches which are fitted with semiconductor switches and freewheeling and circuitry elements the semiconductor switches and the freewheeling and circuitry elements being arranged in at least two paths which run along one path direction, and a phase connection being formed by a center tap between the two branches;

wherein a bus system is provided between the at least two paths and forms potential chambers around at least one of a) the semiconductor switches, b) the freewheeling elements and c) the circuitry elements.

2. The converter as claimed in claim 1, wherein each potential chamber comprises two non-touching, in particular overlapping, electrically conductive longitudinal metal sheets which run along the path direction.

3. The converter as claimed in claim 2, wherein the longitudinal metal sheets are at least one of electrically connected and mechanically connected to at least one of a) the associated semiconductor switches, b) the freewheeling elements and c) the circuitry elements.

4. The converters as claimed in claim 3, wherein two electrically conductive transverse metal sheets are arranged essentially at right angles to the path direction, and provide at least one of an electrical and a mechanical connection between the longitudinal metal sheets and at least one of a) the associated semiconductor switches, b) the freewheeling elements and c) the circuitry elements.

5. The converter as claimed in claim 2, wherein the bus system comprises a mid-potential rail which is arranged between the potential chambers of the first and second path and is connected to a mid-potential of the intermediate circuit.

6. The converter as claimed in claim 1, wherein the bus system which forms the potential chambers is filled with an insulating compound.

7. The converter as claimed in claim 1, wherein the semiconductor switches and the circuitry elements are arranged in separate paths.

8. The converter as claimed in claim 7, wherein the semiconductor switches are arranged in a first and a second path which are arranged parallel; wherein positive and negative connections are arranged at one end of the paths, and a phase connection is arranged at the opposite end of the paths.

9. The converter as claimed in claim 7, wherein the path containing the circuitry elements is arranged opposite the path containing the semiconductor switches, the positive connection is arranged on one side of the paths containing the circuitry elements and the semiconductor switches, the negative connection is arranged on the opposite side of the paths, and the phase connection is arranged in the center of the semiconductor switch path.

10. The converter as claimed in claim 1, wherein the longitudinal metal sheets have a shape which surrounds the semiconductor switches, the freewheeling elements and the circuitry elements in the form of a dome.

11. The converter of claim 1, wherein each potential chamber surrounds one element, and the one element is one of a semiconductor switch, a freewheeling element, and a circuit element.

12. The converter of claim 1, wherein the bus system includes a rail arranged between the potential chambers of the first and second paths and electrically connected to the center tap.

* * * * *